Nov. 14, 1950  C. HOLLERITH  2,529,731
DEBOOSTER
Filed Sept. 20, 1946
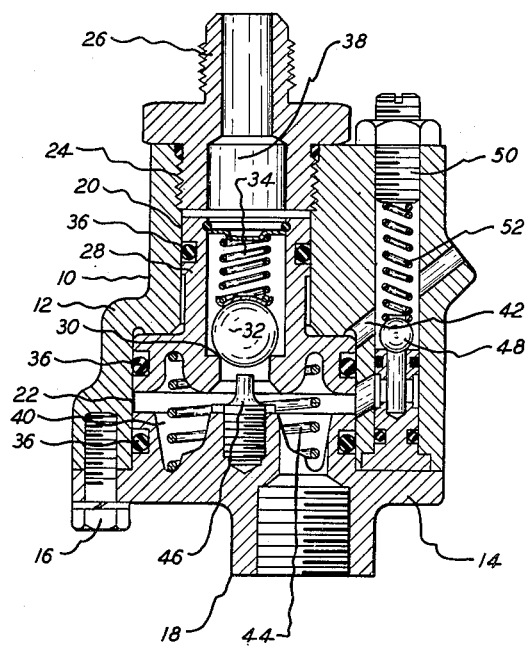
Inventor
CHARLES HOLLERITH
By Bearman & Patch
Attorney Patented Nov. 14, 1950

2,529,731

UNITED STATES PATENT OFFICE 2,529,731

DEBOOSTER

Charles Hollerith, Jackson, Mich., assignor, by mesne assignments, to The B. F. Goodrich Company, Akron, Ohio, a corporation of New York Application September 20, 1946, Serial No. 698,166

5 Claims. (Cl. 137—153)

The present invention relates to improvements in fluid pressure deboosters.

The principal object of the present invention is to provide a debooster for fluid pressure which is extremely compact in design, and one in which the movable wall structure having differential area has a relatively short stroke.

This and other objects and advantages residing in the specific construction, combination and arrangement of the component parts will be more fully appreciated from a consideration of the following specification and annexed claims.

In the drawing, a vertical cross-sectional view is shown through a debooster construction embodying the principles of the present invention.

Referring to the drawing, the debooster 10 comprises a main cast body 12, a plate 14 closing one end of the body 12 and being secured in position by cap screws 16, with a low pressure connection being provided at 18. The body 12 is provided with cylindrical chambers 20 and 22 of different diameters. The wall of the chamber 20 is threaded at its upper end 24 to receive the threaded high pressure inlet connection 26.

Supported for limited reciprocating movement within the chambers 20 and 22 is a piston 28 of differential area on opposite sides of the valve seat 30 against which the ball valve 32 is urged by the spring 34. O-section sealing rings 36 seal fluid pressure within the chambers 38 and 40, defined on opposite sides of the valve seat 30. To assure atmospheric pressure on one side of the sealing rings 36 associated with the piston 28, a vent 42 to atmosphere is provided. The spring 44 is seated on the plate 14 and acts to support the piston 28 in the position indicated in the drawing, with the ball valve 32 engaging with its seat 30.

High pressure fluid entering the chamber 38 through the inlet connection 26 will react against the area above the valve seat 30 to lower the piston 28 independent of the spring 44 to bring the ball valve 32 into contact with the unseating pin 46. As should be apparent from the drawing, very little movement of the piston 28 is required before the ball valve 32 is unseated and high pressure fluid is throttled between the seat 30 and the valve 32 into the chamber 40 where the reduced pressure becomes effective against that area of the piston 28 on the low pressure side of the valve seat 30. Depending upon the differential area of the piston 28 upon opposite sides of the valve seat 30 and the calibration of the spring 44, the throttling action is effected by movement of the piston 28 controlling the degree of unseating of the ball valve 32 and will result in a predetermined deboosting of hydraulic pressure between the pressure inlet 26 and the pressure outlet 18. To prevent any possibility of equalization of pressures in the chambers 38 and 40, a pressure relief valve 48 controls the passage of fluid from the chamber 40 to atmospheric pressure through the passage 42. In practice the passage 42 may drain directly into an atmospheric sump or reserve or it may be suitably connected with such structure. By regulating the adjustment screw 50 to vary the tension on the spring 52, the relief valve 48 can be set to open at the maximum deboosted pressure desired in the chamber 40 and be delivered through the outlet 18.

While the debooster herein disclosed is not limited in its field of operation, it has been especially designed for deboosting operating pressures in hydraulic brakes in aircraft. Because of its compactness and extremely short operating stroke, the debooster according to the present invention is especially adapted to the aircraft field. The illustrated construction has been designed to connect with the accumulator having a pressure of fifteen hundred pounds per square inch and is capable of satisfactorily reducing the pressure to the brake to five hundred pounds per square inch.

Having thus described my invention, what I claim as new and desire to cover by Letters Patent is:

1. A compact minimum stroke fluid pressure debooster comprising a body having merging cylindrical chambers of different diameter, a stepped piston supported in said chambers for limited axial movement, an axial passage through said piston, a valve seat defined in said passage between the high and low pressure sides of said piston, a check valve on the high pressure side of said piston engaging with said seat, said piston dividing said chamber into high and low pressure chambers with the effective pressure area on the low pressure side of said piston on one side of said seat being greater than the effective pressure area on the high pressure side of said piston on the other side of said seat, unseating means for said check valve constructed and arranged to engage with said valve and lift it from its seat to throttle fluid pressure between said high and low pressure chambers upon movement of said piston by high pressure in one direction, fluid pressure throttled by said valve reacting against the greater effective area of said piston on the low pressure side of said seat to move said piston in the opposite direction to regulate and control the throttling action of fluid pressure, the essential stroke of said piston being established by the closed and maximum unseated positions of said valve, and spring means acting upon said piston for continuously urging the piston in a direction away from said unseating means, whereby said check valve is normally closed.

2. A fluid pressure debooster comprising in combination a casing having inter-communicating differential diameter cylinder spaces, a stepped piston supported in said cylinder spaces for limited axial reciprocation, and having a central axial passageway therethrough, a valve seat in said passageway, a check valve in the latter and engageable with said valve seat to close the high pressure side of said piston to the low pressure side thereof in one condition of the debooster, said piston dividing the said casing into high and low pressure chambers with the effective piston area on the side of said seat remote from the high pressure chamber being greater than the effective piston area upon the opposite side of said seat, resilient means normally urging the check valve in the closed direction with respect to its seat, unseating means for said check valve operable to unseat the valve when the piston is moved in one direction by the high pressure fluid, whereby to throttle the fluid between said high and low pressure chambers, and resilient means resisting increased throttling movement of said piston, the differential fluid pressure conditions set up within the casing constituting the sole means for controlling the reciprocation of said piston and the effective stroke of the latter corresponding only to the fully closed and fully unseated positions of said check valve, said valve seat being formed at the end of the said piston passageway adjacent the low pressure chamber, and a spring enclosed within said passageway for urging the valve into its closed position with respect to said seat, the valve unseating means being provided within said low pressure chamber for unseating the valve automatically as the piston is moved in one direction by the high pressure fluid.

3. A fluid pressure debooster comprising in combination, a casing having inter-communicating differential diameter cylinder spaces forming a high pressure cylinder space and a low pressure cylinder space, a stepped piston supported in said cylinder spaces for limited axial reciprocation and having a passageway therethrough affording communication between the two cylinder spaces, a valve member carried by said piston and adapted to control the opening and closing of said passageway, a spring normally urging said valve member into its closed position to cut off the fluid flow from the high pressure side of the piston to the low pressure side thereof, an unseating member for said valve, said unseating member being carried in the low pressure cylinder space, and another spring operating in the reverse direction to said aforesaid spring and adapted normally to urge said piston in the direction of the high pressure cylinder space, whereby movement of said piston in the direction of said unseating means takes place against the action of said second spring.

4. A fluid pressure debooster as claimed in claim 3 wherein said unseating means consists of a pin element adjustably secured in said low pressure cylinder space whereby the projection of the pin into the latter is capable of fine adjustment.

5. A fluid pressure debooster as claimed in claim 3 wherein said valve spring is entirely supported within the piston whereby this spring is supported independently of said casing and makes possible valve operation by the spring without affecting piston movement.

CHARLES HOLLERITH.

REFERENCES CITED

The following references are of record in the file of this patent:

UNITED STATES PATENTS

| Number | Name | Date |
| --- | --- | --- |
| 1,137,551 | Toby | Apr. 27, 1915 |
| 1,305,964 | Dickson | June 3, 1919 |
| 2,043,453 | Vickers | June 9, 1936 |
| 2,051,100 | Nelson | Aug. 18, 1936 |
| 2,291,033 | Goepfrich | July 28, 1942 |